Figure 1:
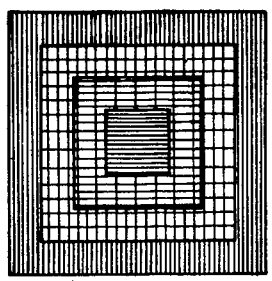

March 19, 1940.                    W. MICHAELIS                    2,193,931
            PROCESS FOR PRODUCING MULTICOLORED PHOTOGRAPHIC IMAGES
                            Filed March 23, 1937

INVENTOR.
WALTER MICHAELIS
BY
ATTORNEYS.

Patented Mar. 19, 1940

2,193,931

UNITED STATES PATENT OFFICE 2,193,931

PROCESS FOR PRODUCING MULTICOLORED PHOTOGRAPHIC IMAGES

Walter Michaelis, Brussels-Forest, Belgium, assignor to Bela Gaspar, Brussels, Belgium Application March 23, 1937, Serial No. 132,629
In Germany March 24, 1936

3 Claims. (Cl. 95—2)

The present invention relates to a method of producing colored photographic images, more particularly double color images in which a positive dyestuff image is combined with a differently colored negative dyestuff image of the same photographic record.

In my co-pending application, S. N. 72,395, now Patent No. 2,136,143, I have described and claimed broadly the combination in a multilayer photographic material, of a colored positive image of a photographic record and double images (in the same or different layers) of a different photographic record. These double images described and claimed in my co-pending application are inversely arranged and mutually differently colored to represent a positive and a negative of said different photographic record. The mutually differently colored double images of the aforementioned application may be produced in accordance with this invention.

These two-color images in which the photographic record constitutes a color separation picture are particularly useful, when combined with a different color separation picture of the same object, as master images for multicolor photographic printing processes as described and claimed in my divisional application S. N. 280,659, filed June 22, 1939.

The two-color images of the present invention resemble black and white pictures inasmuch as they only show gradations of light and shadow of one and the same image. They differ however in character from these non-colored black and white pictures in that the contrasts of light and shadow are simultaneously combined with contrasts in color in such a way as to let the places of greatest contrast of light and shadow appear each in one single pure color, whereas in the places of transition between light and shadow one color is present in decreasing concentration and at the same time the other color in increasing concentration.

These two-color images therefore resemble the two-color images of normal subtractive color-photography as concerns their colored appearance, however the constitution of the picture is entirely different. In the case of veritable two-color pictures the distribution of each of the two colors on the image corresponds to one of two different color-selection pictures, and each of the two differently colored different color selection pictures is colorless or respectfully fully colorized at its points of greatest contrast of light and shadow.

On these two-color images the transition from light to shadow of one and the same picture is recorded twice: first, by an increase in concentration of one dyestuff, and second, by a corresponding decrease in concentration of an other dyestuff, the dyestuff being chosen in such a manner that each is transmittant for light for which the other is absorptive.

These pseudo-two-color pictures have already been known for some time as a substitute for veritable two-color pictures. Until now they have however not attained any importance in the technique of photography. As neither white nor black appears on them, they had no chance of competition against the true two-color pictures by which black and white can be produced in addition to the numerous color gradations between the two basic colors. They lost all practical interest the more the natural three-color film became practically realizable.

I have found that these two-color images can be used in a photographic printing process in which a master image is used, composed of two dyestuffs each of which is absorptive for light which is transmitted by the other dyestuff, the dyestuffs being distributed in such a manner that increasing contrasts of light and shadow of the image are registered by an increasing proportion of the one dyestuff and a correspondingly decreasing proportion of the other dyestuff, the printing process being performed by printing with colored light highly absorbed by the one of the two dyestuffs on to a light sensitive layer which is sensitive for the colored printing light used.

Figure 2:
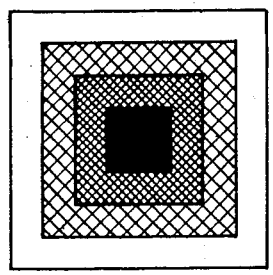
Figure 3:
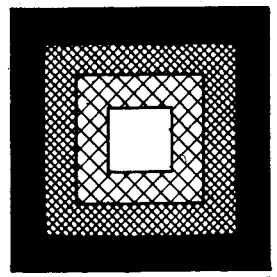

This invention is applicable to many photographic purposes, as it offers many possibilities of execution. In order to offer a better explanation of the forms of realization the principle of the invention may be explained with reference to the schematical Figures 1–3. As master image a figure may be supposed consisting of several frames situated concentrically around an interior square. The interior square may be dyed by one color alone, and the exterior frame-like area also by only one color which is different from the first. The zones situated between the interior square and the exterior frame are to be dyed by both colors, and as a matter of fact, in such a manner that the proportion of one of the components decreases to the same extent that the proportion of the other increases, so that one might say that two color wedges are shifted into each other. In the supposed example (Fig. 1) the exterior frame-like zone is dyed purely red (dense vertical striping), whereas the interior square is dyed purely green (dense horizontal striping). In the intermediate zones both dyestuffs are present, and as a matter of fact, in the second zone from the outside there is more red than green, whereas in the third zone there is more green than red. This is illustrated in the drawing by striping which is more or less dense. The two colors red and green are merely mentioned as an example; other colors can be employed in their place, provided that a spectral absorption zone of the one of the dyestuffs corresponds to the spectral absorption gap of the other dyestuff. It is possible that the absorption zones of the two dyestuffs partially cover each other or, on the other hand, that they do not border each other completely, so that light of a certain wave length is affected by neither of the two dyestuffs. A mixture of dyes of identical or similar absorption qualities may be used instead of a dyestuff which is chemically uniform.

Two-color master images as schematically shown in Fig. 1 may be produced in different ways. Thus, for example a fixed silver image diffusely dyed by Diamine Fast Pink G, applied before or subsequent to exposure, is treated for several minutes by the following solution:

| | Gr. |
|---|---|
| Thiocarbamide | 5 |
| $H_2SO_4$ | 1 |
| Water | 100 |

By this treatment the dyestuff is destroyed at those places of the image where silver is present. These places are dyed blue by bleaching the remnant silver with 2% solution of ferricyanide of potassium and washing the image and treating by a solution of:

| | Gr. |
|---|---|
| Ferrichloride | 2 |
| Oxalic acid | 1 |
| Potassium bromide | 1 |
| Water | 100 |

The image obtained in this manner after fixing is dyed blue where the silver deposit was present, and red at the places unexposed. Where the intensity of the red color decreases the density of the blue color increases. The places of greatest contrast are dyed purely red and purely blue respectively.

If for the purpose of dyeing the layer containing the silver image the dyestuff Janus Green is used instead of Diamine Fast Pink G, this dyestuff will be decolorized at the points of the silver deposit in a similar manner as Diamine Fast Pink G by the thiocarbamide solution. But thereafter a red body is formed at the decolorized points either in air, or, still more easily, by an after-treatment with oxidizing agents; at the places free of silver no modification is caused by the transforming bath. In other words, by employing this dyestuff a two-colored image is obtained, which appears green or red at the places of extreme contrast of light and shadow, and reddish or greenish grey in the transitory spaces between light and shadow.

Instead of employing the mode of transformation of the remnant silver image known toning processes may be utilized. An especially wide selection of different color-tones is offered by the so-called "process of color development." For example, a diffusely blue dyed silver image diffusely dyed by Diamine Pure Blue (Color Index 518) may be used. The destruction of the dyestuff by, for instance, a solution of thiocarbamide, is performed in such a manner as to prevent the silver from being entirely dissolved. The remaining silver is transformed into silver chloride by a 5% solution of cupric chloride or by a solution containing 0.2% of potassium bichromate and 2 gr. sodium chloride in 100 ccm. water. The silver chloride picture is submitted to colored development after intense exposure or after treatment with a fogging agent. When developing with a solution of—

| | | |
|---|---|---|
| Chloro-aceto-acetic-ester | gr | 2 |
| Acetone | ccm | 20 |
| p-Diethyl amino-aniline | gr | 2 |
| Potassium carbonate | gr | 40 |
| Water | ccm | 1000 | a combined image of black silver and yellow dyestuff is obtained. The silver image is bleached out in the usual manner so that a yellow image persists in place of the original silver deposit, whereas at the places free of silver, on the other hand, the undestroyed part of the blue dyestuff is still present. If instead of the chloro-acetoacetic ester, thioindoxyl-carboxylic acid or thioindoxyl are employed, a red image is obtained by an equivalent reaction instead of the above mentioned yellow image.

As heretofore pointed out, images of the kind described and obtained, for example in the manner indicated above may be used in a printing process and some examples of this process and of the various results thus obtained will now be described.

*I. Producing of positive or negative prints at will from one single master image*

The expressions "positive" and "negative" are employed in the following in their general meaning. They shall therefore, for instance, not only mean that the print, if it is called a positive, shows a graduation of light and shadow which corresponds to the original, but the expressions are to refer to two prints produced by one and the same master image, one of which shows a distribution of light and shadows opposite to the other.

The master image represented in Fig. 1, with red framelike zones on the outside and a green square on the inside, is printed on printing material sensitive to green by use of green printing light. This light is absorbed only by the partial image of red color, and not by the partial image of green color. As a consequence thereof, in the outermost purely red zone all of the printing light is absorbed, whereas the following surfaces allow more and more light to pass until a maximum is reached in the interior square. This surface allows practically all of the light to pass. Therefore the printing material is blackened most intensely in this zone. The appearance of the print produced in this manner may be seen in Figure 2.

If on the other hand the same red-green master image is printed by use of red printing light on printing material sensitive to red, a blackening in the opposite sense is attained: The innermost square, dyed purely green, absorbs all of the light, so that the print remains transparent in this zone. The further the outside zone is approached the more light is transmitted, so that the developed print shows a blackening graduated in the manner illustrated in Fig. 3.

A comparison of the two prints shows that it is possible to produce by one single printing step facultatively positive or negative copies in starting from one and the same master image. It is only necessary to vary the printing light employed, and thereby to statisfy with great facility the want of the photographer to obtain at will negatives or positives from one single image. In addition to that, it is possible to blacken the printing layer under the master image uniformly by selecting a printing light which is absorbed and transmitted to the same extent by both colors.

A printing material may be employed which is sensitive to both printing lights, so that positive or negative images may be produced facultatively on one and the same film. This possibility can be utilized for:

II. Producing rhythmically moved trick-film-images

One and the same master image is printed on a film several times in succession: For instance, the printing light is changed from green to red and back again after every eighth image. In this way alternating series of pictures of positive or negative character are obtained, which alternate every half-second if the film is reproduced at the rate of 16 images per second. If the change of the printing light is performed gradually instead of precipitously, the print will show an undulatory swelling and fading of the positive and negative images when reproduced. Films of this sort can be utilized, for instance, for the presentation of titles.

Another mode of execution of this process can for instance consist in performing the change of the printing light not between two consecutive images but within one and the same area. For this purpose the selection filter which determines the color of the printing light may be of any shape whatsoever and can be displaced between two images. In this way turbulent effects can be produced.

III. Producing colored prints on multilayer material

The prints produced according to the invention may be colored by toning the silver of the print, by converting it into colored images, by staining or colored development, or by producing silver images on a colored background by means of virage or by other processes. By this process duplicates of the master image may be produced, the colors of the duplicate being either the same or different from those of the master image. If for instance, the red and green colored single master image shown in Fig. 1 is simultaneously or successively printed by red and green printing light on to a printing material consisting of a layer sensitive to red and a layer sensitive to green, silver images are obtained in the two layers with interchanged values of transparency, that is to say, images, which are related to each other as positive and negative.

It is then possible to dye one of the layers by a certain dyestuff and the other layer by another, for example at the exposed places. If the dyeing corresponds to that of the master image, a correct duplicate of the colored master image is attained. In the same manner the prints can be colored by any other desired pair of colors. Thus, for example, a two-layer printing material one layer of which is sensitive to red and the other to green, is dyed either already during the manufacture of the emulsion or subsequently, the layer sensitive to red being dyed with Diamine Fast Pink G and the layer sensitive to green with Chrysophenine G. After development of the silver image, the dyed layers are treated by a solution of thiocarbamide of the composition mentioned previously, whereby the dyestuff is destroyed at the places where silver is present. The final image is of a yellow color in the outer border zone, in the interior square it is red, whereas the transitory zones appear in orange of various shades. A two-color image of this kind can again be used as master image, in which connection the printing light for the two colors mentioned above would have to be green on the one hand and blue on the other.

IV. Producing artistic color change effects

If the printing is performed in the same manner on multilayer printing material, however not simultaneously, but successively on consecutive image squares of the printing film by use of alternating printing light, dyestuff-images are obtained, after the conversion, which correspond to those described in Paragraph II for black and white copies. If a master image as schematically shown in Fig. 1 and printing material with two layers, each of which results in an image of different color, are used, the running off of the print results in a regular swelling and fading of colored images. If one of the layers used is dyed red-orange, and the other blue-green, and if the dyestuff is destroyed at the places covered by silver the following series of images is obtained by employment of the master image represented by Fig. 1:

The outer zone shows a regular oscillation between black and blue-green, the interior square oscillates simultaneously between red-orange and black, whereas the intermediate zones appear in changing color-mixtures.

Other pleasant color effects are attained by application of various printing lights to different areas of one and the same image-square, as has already been described in Paragraph II. The border-line between the two printing lights may be displaced between each image and the next following.

V. Producing color selection pictures for multicolor photography

As is known, there are two principal processes for producing colored images. In one of these, the image is dyed at the exposed places, or the dyestuff which dyes the layer in a diffuse manner, is destroyed at the unexposed places. For producing images of this kind, a master image is necessary which as compared with the print is a negative.

The other process consists in dyeing the printing material subsequently at the unexposed places, or in removing the dyestuff at the exposed places of a diffusely dyed image. For prints produced in this manner, master images must be used which, as compared with the print, are positives.

A double and inversely colored master image, as produced according to the invention can, as will readily be seen, be applied notwithstanding which of the two processes for the producing of colored images is used. For example, a master image, as schematically shown in Fig. 1—of red and green color—which has been taken as a red selection part image of a multicolor image behind a red filter and which is to be reproduced in blue-green color on the print, is—if the print is to be colored at the exposed points by transforming the silver into a mordant and application of a blue-green mordant dye—printed on a silver halide emulsion layer sensitive to green by a green printing light. However, the same red-selection can be printed by red printing-light on a layer sensitive to red, if the print is to be colored at the unexposed points, for example by hardening the layer at the exposed points and applying a solution of a blue-green dyestuff, for instance Diamine-Pure Blue FF, which only dyes the unhardened gelatine.

In case the unexposed printing material is already colored blue-green, red printing-light can of course not be used. The two-colored master image must in this case be colored purple-red and yellow, and must be printed by green or blue printing light. In the same manner as described above concerning the red-selection the printing of a green selection or a blue selection of a three-colored image may be performed. It has been found that the color combination: blue-green and yellow is especially appropriate to the master image for the green-selection, whereas the combination: blue-green and purple-red is the most suitable for the blue-selection.

VI. Producing multicolored pictures by means of multicolored inseparably connected master images In accordance with this invention and as described and claimed in my divisional application Ser. No. 280,659, filed June 22, 1939, the double and inversely colored master images may be inseparably combined either with one-colored master images or with differently colored double-colored master images. Multicolor images in differently colored layers may be obtained for instance by several color-photographic taking processes in which the negative material consists of multilayer material comprising superimposed layers of different sensitivity. It is however also possible to produce such combined master images independently of the nature of the taking process.

The present invention may be used in this way for the purpose of suppression disturbing effects in printing multicolor master images.

In order to print an ordinary color master image, one layer of which contains a color selection picture—for instance a red selection—in the form of a magenta dyestuff image and the other layer of which contains another partial selection—for instance a green selection—in the form of a blue-green dyestuff image, the normal procedure is to print the magenta dyed red selection by green printing light. If this is done, however, a faint image of the green selection will be superimposed on the red-selection because the blue-green color of the green-selection is not quite transmittent for green light. An undesired disturbing printing effect is thus produced which impedes the exact reproduction of the natural colors. In accordance with the invention, at least one partial selection picture—that which has the disturbing effect during the printing of the other or others—is made in such a manner as to be doubly printable. Therefore in the example mentioned above, the green selection is dyed not only blue-green, but also yellow in inverse color intensity. Green printing light of such spectral composition is then used for printing the magenta dyed part image that the undesired absorption of the blue-green part image for the printing light at the points of the image where such blue-green dyestuff is present in maximal concentration is equal to the absorption of the auxiliary yellow dyestuff at those places, where the blue-green dyestuff is not present and the yellow dyestuff is applied in its maximal concentration. Therefore a faint image not only of the blue-green image but also of the yellow parts is obtained in the print of the magenta image. As these two accessory pictures are related to each other as negative and positive images, they compensate each other.

What has just been said for the partial colors red and green—as color selections—also holds good for other combinations of partial colors.

The inversely graduated dyeing of the doubly printable layers may be performed in unequal intensity. For instance, if multilayered master images are employed, the colors of the individual layers which show a corresponding distribution of light and shadow, as for instance all positive color selection pictures of a multicolor image, can be applied in a higher concentration, whilst the images showing an inversed distribution of light and shadow are colored by a dye of lower concentration. Such colored master images may be produced in the following ways:

1. The dyestuffs of the superimposed layers of diffusely dyed multilayer material are destroyed simultaneously at the places at which silver is present by a solution of thiocarbamide of the composition described previously. The silver is then converted into a mordant at the surface of the multilayer material, that is to say in one layer only, and slightly dyed by a basic mordant dyestuff. Finally the silver is removed from the layer by fixing.

2. The dyestuffs are destroyed at the places at which silver is present as in Example 1. The silver salt which is produced in this manner is then converted on the surface only to silver by means of a developer, the greater part of the silver is however removed by fixing. The silver image situated at the surface is converted into a mordant and dyed by mordant dyes.

3. A picture is taken on multilayer recording material, in which the lowest layer is dyed purple-red and sensitive to red, the middle layer dyed yellow and sensitive to green, and the uppermost layer is colorless and sensitive to blue; after exposure and development the front layer is dyed uniformly blue-green. Three color selection pictures are thus obtained, one in each differently dyed layer. The dyestuffs are then destroyed at the places covered by the silver images by means of an acid solution of thiocarbamide. The silver is thereafter converted into silver chloride by an acid solution of cupric chloride and the silver chloride is then intensively exposed and submitted to the same process of colored development as described above for the treatment of one layer alone. In this way yellow or red negative images are obtained in one or more layers which are colored differently from the dyestuff-positive-images obtained at first. By quick development or by employment of developers containing materials which prevent swelling, such as neutral salts, the colored development may be limited to the front layer or to the surface thereof. In order to obtain colored negatives in combination with the differently colored positives, the top layer is developed by the developer which for instance results in an image of yellow color. Thereafter development is continued by use of the developer resulting in an image of red color. In this way, in the uppermost layer an accessory negative image of yellow color is obtained, whereas in the second layer an accessory negative image of purple-red color is obtained.

What I claim is:

1. A process for producing a master image for photographic purposes in which a silver image which is uniformly dyed with a dyestuff is treated with a dyestuff destroying agent which acts to destroy the dyestuff at the points where silver is present without adversely affecting said silver image, transforming the silver image into a silver salt image which will combine with a coloring substance to produce a dyestuff image of a color different from the color of the original dyestuff and treating said image with said coloring substance.

2. A process for producing a master image for photographic purposes in which a silver image which is uniformly dyed with a dyestuff is treated with a dyestuff destroying agent which acts to destroy the dyestuff at the points where silver is present without adversely affecting said silver image, transforming the silver image into a silver salt image which will form a mordant for dyestuffs and treating said image comprising said mordant, with a dyestuff of a color different from the color of the original dyestuff.

3. A process for producing a master image for photographic purposes in which a silver image which is uniformly dyed with a dyestuff is treated with a dyestuff destroying agent which acts to destroy the dyestuff at the points where silver is present without adversely affecting said silver image, transforming the silver image into a developable silver salt image, treating said silver salt image with a developer which reacts with said silver salt image to form a silver image and colored by-products in situ therewith, said colored by-products being of a color different from the color of the original dyestuff and thereafter removing said silver image.

WALTER MICHAELIS.